US 6,655,523 B2

(12) United States Patent
Jones et al.

(10) Patent No.: US 6,655,523 B2
(45) Date of Patent: Dec. 2, 2003

(54) EXCITED FRAME CONVEYOR AND EXCITATION PROCESS FOR SAME

(75) Inventors: Peter Todd Jones, Walla Walla, WA (US); James Dale Ruff, Walla Walla, WA (US); James Gale, Walla Walla, WA (US)

(73) Assignee: Key Technology, Inc., Walla Walla, WA (US)

( * ) Notice: Subject to any disclaimer, the term of this patent is extended or adjusted under 35 U.S.C. 154(b) by 95 days.

(21) Appl. No.: 09/810,307

(22) Filed: Mar. 15, 2001

(65) Prior Publication Data

US 2002/0130015 A1 Sep. 19, 2002

(51) Int. Cl.[7] ............................................... B65G 27/20
(52) U.S. Cl. ...................... 198/770; 198/763; 198/766; 198/770; 198/771
(58) Field of Search ................................. 198/770, 763, 198/771, 766, 750.1, 752.1, 753, 760, 761, 764

(56) References Cited

U.S. PATENT DOCUMENTS

| 2,353,492 | A | * | 7/1944 | O'Connor ................... 198/763 |
| 2,951,581 | A | * | 9/1960 | Long et al. .................. 198/766 |
| 4,260,052 | A | * | 4/1981 | Brown ........................ 198/763 |
| 4,274,953 | A | * | 6/1981 | Jackson ...................... 209/326 |
| 4,313,535 | A | * | 2/1982 | Carmichael ................. 198/766 |
| 4,530,431 | A | * | 7/1985 | Spurlin ....................... 198/534 |
| 4,771,894 | A | * | 9/1988 | Lapp .......................... 198/770 |
| 5,037,536 | A | * | 8/1991 | Koch et al. .................. 209/325 |
| 5,054,606 | A | * | 10/1991 | Musschoot .................. 198/761 |
| 5,178,259 | A | * | 1/1993 | Musschoot .................. 198/770 |
| 5,265,730 | A | * | 11/1993 | Norris et al. ............... 198/770 |
| 5,477,958 | A | * | 12/1995 | Buhren et al. .............. 198/770 |
| 5,713,457 | A | * | 2/1998 | Musschoot .................. 198/760 |
| 6,024,210 | A | * | 2/2000 | Rosenstrom ................ 198/770 |
| 6,041,915 | A | * | 3/2000 | Fishman et al. ............ 198/766 |
| 6,047,811 | A | * | 4/2000 | Zittel et al. ................. 198/771 |
| 6,189,683 | B1 | * | 2/2001 | Svejkovsky et al. ........ 198/769 |
| 6,415,913 | B2 | * | 7/2002 | Sleppy et al. ............... 198/766 |

* cited by examiner

Primary Examiner—Douglas Hess
(74) Attorney, Agent, or Firm—Wells St. John P.S.

(57) ABSTRACT

An excited frame conveyor is described with a conveyor bed movably supported on a frame having a structural frequency and a vibratory drive on the frame operable to vibrate the frame at an operational frequency that is greater than the structural frequency of the frame.

5 Claims, 8 Drawing Sheets

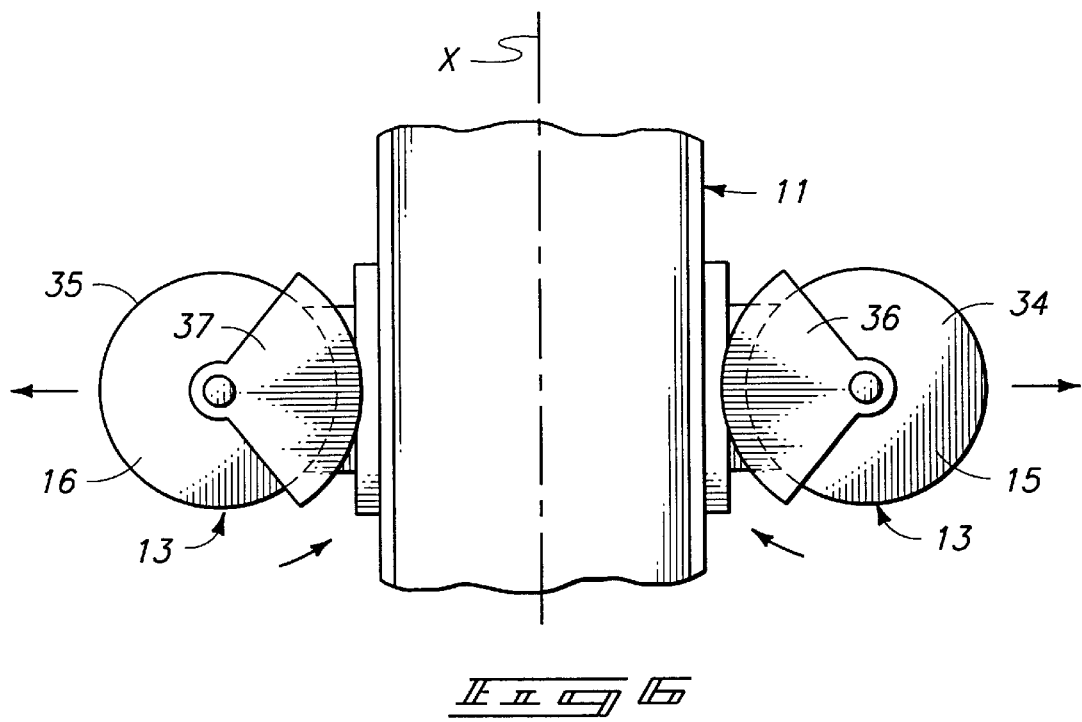
_Fig. 6_
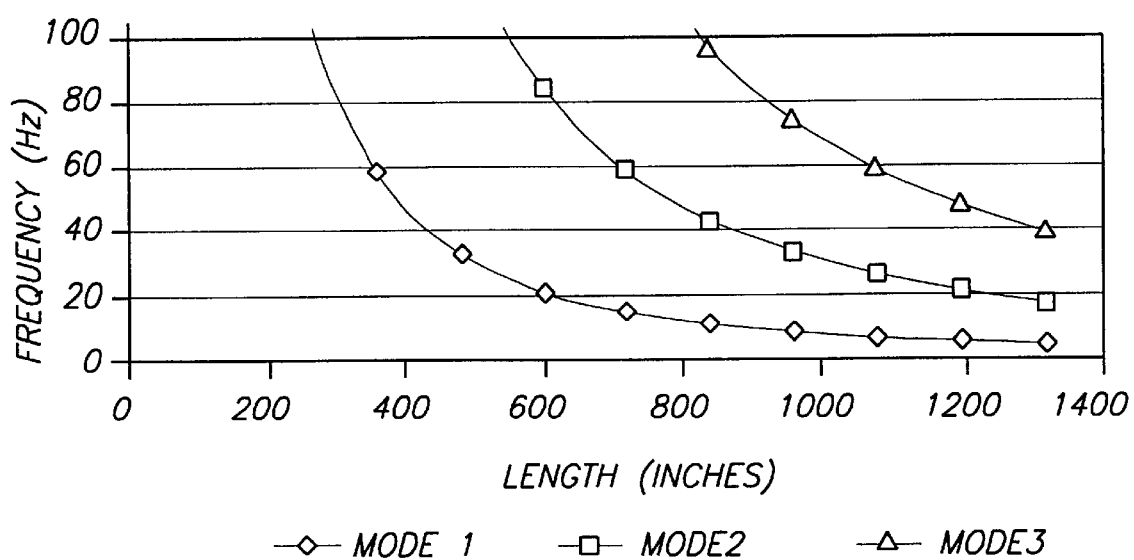
_Fig. 7_

MODE 1

MODE 2

MODE 3

EXCITED FRAME CONVEYOR AND EXCITATION PROCESS FOR SAME

TECHNICAL FIELD

The present invention relates to an excited frame conveyor and more specifically to conveyors which utilize vibratory motion for the distribution, collection, or transfer of a product.

BACKGROUND OF THE INVENTION

Vibratory conveying systems are commonly used in the food and other industries where belt type conveyors are undesirable or where it is difficult to maintain the conveyors in a sanitary condition. Vibratory conveyors make use of a conveyor bed that includes an elongated tray which is made to vibrate predominantly in a desired direction and at an angle such that materials deposited on the bed will migrate or travel at a selected speed from an infeed end of the bed to a discharge end.

Excited frame vibratory conveying devices are known in the art. For example, U.S. Pat. No. 4,313,535, which is incorporated by reference herein, shows an exemplary excited frame conveying apparatus that has performed well in the past for transporting bulk product over relatively short distances.

As best seen in FIGS. 1 and 2, a prior art excited frame conveyor similar to that shown in the patent above, includes a vibratory drive mounted on an elongated frame. The frame is supported between a rigid, ground supported base, and the bed of the conveyor receives and moves product along the conveyor length. A resilient suspension in the form of leaf or beam springs project upwardly at spaced intervals along the frame, and are inclined in the direction of the intake or infeed end of the conveyor.

The elongated conveyor or product transporting bed is mounted on the upper ends of the respective beam springs. The conveyor bed is supported by the beam springs in a generally parallel relationship to the frame, and in a substantially overall horizontal orientation. Due to the resiliency of the respective beam springs, the product conveying bed is capable of moving relative to the frame in response to a force supplied to the bed by the vibratory drive mounted on the frame. During operation of the apparatus, the vibratory drive produces an oscillating vibratory force. This force may be generated by rotating eccentric weights mounted on the vibratory drive.

As will be recognized the vibratory drive is mounted on the frame and therefor imparts vibratory motion to the frame, which is then transferred through the beam springs to the conveyor bed. As a result, the bed vibrates at substantially the same frequency as the drive and frame.

Isolation springs are also typically mounted between the frame and the earth's surface by way of supports that are spaced along the length of the conveyor. The isolation springs are used to "isolate" vibration of the frame to minimize transmission of vibratory forces to the supports.

A conveyor bed that is displaced from its "at rest" position and then allowed to oscillate freely will oscillate at its natural or "harmonic frequency". This frequency is dependent upon the combined spring constant, the number of springs supporting the bed, as well as the mass of the bed.

As a general matter for conveyors of this design, less vibration and force is transferred to the floor or other supporting structure by an excited frame conveyor design because of the small vibrational amplitude of the frame, as compared to the vibrational amplitude of the product conveying bed. The low level of vibrational force transferred to the surrounding structure is a chief advantage of the prior art excited frame vibratory conveyor as seen in FIGS. 1 and 2. In view of the relatively short length and rigidity of the frame operational frequencies of the conveyor bed do not generally approach the frequency modes in the frame at which the frame and conveyor bed will begin to move in directions not conducive to transport of product.

It should be understood that it is not unusual for a conventional excited frame conveyor to operate at frequencies over the natural frequencies of the system (system frequencies). An example of such a device is illustrated in the O'Connor patent (U.S. Pat. No. 2,353,492). In this reference the beds and frames are considered to be rigid members (due to the typically short machine length and the rigid mass of the structures). As such, the structural frequencies of the bed and frame are much higher than the operating frequencies. The frequencies of interest in O'Connor are actually isolator frequencies which relate to the springs and masses (as rigid members) only. Conventional drives are easily capable of ramping or accelerating through these isolator frequencies in this type of system, and may operate at frequencies which do not cause the bed or frame structural frequencies to become a design consideration.

It has long been recognized that excited frame vibratory conveyors under certain operational conditions may excite frame structural frequency modes that result in undesirable and even destructive motion of the conveyor bed, or the entire conveyor system. As a general matter this is usually not a problem with the above-noted short frame conveyors where the frame frequencies are well above the operating frequencies. However, if longer frames are fabricated, the structural natural frequencies of the frame decrease and become important factors in the overall conveyor design.

To overcome the problems encountered when conveyor lengths increase, the frame must be stiffened in order to keep the frame structural frequencies well beyond the desired operational frequencies. This solution however does not remain commercially practical beyond a length of approximately 40 feet, due to cost constraints. Thus, when it becomes desirable to transport materials on an excited frame conveyor over distances greater than 40 feet, serious consideration must be given to the issue outlined above.

As would be expected an excited frame will become "soft" or will otherwise bend more readily as the length of the frame increases. Along with increasing frame length, the distance decreases between frequency modes at which the frame may become excited and begin to move in undesirable directions. Still further, as frame length increases, the frequencies at which undesirable modes occur decrease. This relationship is shown graphically in FIG. 7 of the drawings, where three separate frame structural modes are shown and which decrease in frequency with a corresponding increase in the frame length. Still further the distance between modes correspondingly decrease as the frame length increases. The techniques for designing conveyors less than 200 inches are well known in the art, especially since structural modes do not typically come into play at frame lengths under that length.

If a long conveyor is to be operated below its structural frequency modes to avoid the difficulties noted above, the obvious solution is to lower the operating frequency of the drive below the undesired structural frequency or increase the stiffness of the frame. However, lowering the operating frequency decreases the conveying speed which reduces the capacity of the conveyor; while increasing the frame stiffness can significantly increase the cost.

Experience has shown that excited frame conveyors should move material at flow rates of approximately 20–150 feet per minute. To achieve such flow rates with conveyors greater than 40 feet, the operating frequency must typically be beyond at least the first structural frequency of the conveyor frame, unless the frame is braced or otherwise made sufficiently rigid such that the frequency modes occur beyond the operating frequency.

In addition to the foregoing, the energy required to maintain a desired flow rate must also increase because of the added mass of the bed. As a result, a larger drive will be required which adds significant weight to the conveyor and adds complexity to the frame. Therefore, long excited frame conveyors have heretofore been thought to be uneconomical. At least a part of the problem with long "soft" frames (those that can bend) is seen during start-up of the conveyor drive. As noted above, the drive is typically an eccentric mass vibratory drive (typically a motor with eccentric weights mounted to a rotatable drive shaft) that must "ramp up" or accelerate from a speed of zero to an operating speed (RPM) where the frame will vibrate at a predetermined frequency that is beyond at least the first structural frequency of the frame. It is very difficult and often impossible for a conventional drive to pull or take the frame through the first structural frequency.

As noted previously, if a long excited frame conveyor is to operate at normal speeds (to produce the 20–150 feet per minute flow rates experienced with shorter frame conveyors), the vibrational frequency produced by the eccentric mass of drive should be above the first structural frequency of the frame. Thus the drive must ramp up or move through at least the first structural frequency of the frame to reach operating speeds. As the drive ramps up to an operational speed, the conveyor components are exposed to vibratory forces that build in amplitude and vary in direction until a given design point is reached at an operational speed (RPM) where the conveyor functions in a desired manner. Undesired excitation of the frame structural frequency modes should be avoided or minimized when a drive is "ramping up" to operational speed so that maximum drive energy is focused in the desired direction.

As will be recognized, energy that produces undesired frame motion is squandered if it is not used to move product. More importantly, the inertia that is built-up in undesired directions becomes difficult, and may be impossible under some circumstances to overcome with a conventional drive motor. That is to say, the motion and inertia of a laterally oscillating conveyor bed cannot be easily changed into longitudinal oscillating motion because the inertia built-up in the lateral direction must first be overcome. Therefore, the torque required to drive a long frame conveyor through a structural frequency becomes increasingly expensive.

It also becomes increasingly difficult to drive or move through frame structural frequency modes as the drive approaches a given operational speed. This is due to the inertia of the vibrating components. For example, if a frame exhibits an undesirable lateral movement component at low RPM minimal inertia will develop in the frame. As such, the drive could conceivably have ample torque to drive or move the frame through that particular mode. However, as inertia of the frame increases with increasing drive RPM, and when a frame structural frequency mode is encountered near the operational RPM of the drive, significant additional energy (torque) will need to be supplied to overcome the increased inertia developed in the undesired direction. In fact, it has been known that a vibratory drive may stall in a frame natural frequency mode for lack of sufficient energy to overcome the inertia accumulated in the undesired direction.

Prior forms of excited frame conveyors such as that disclosed by U.S. Pat. No. 4,313,535 have drive systems designed such that the primary driving forces lie along a line similar to that shown in FIG. 2, which passes through the system center of mass. The force line is typically at an acute angle to the long dimension of the frame and bed. When it becomes desirable to design a conveyor frame of a length where frame flexibility enters as a design consideration, such angular forces become problematical. Oscillational forces applied at an angle to a long, flexible excited frame would tend to bend the longer "soft" frame during operation. Therefore, long excited frame conveyors with a drive applying a force angularly through the center of mass has simply not been considered a viable possibility.

In view of the foregoing, the present invention is directed to an excited frame conveyor wherein the drive limits the amount of energy put into the frame of an excited frame conveyor as the drive "ramps up" to operating frequency. Still further, minimal damage or wear to the conveyor is avoided as the frame is moved through problematic frequencies. Yet further, increased conveyor lengths are achieved without requiring a corresponding increase in frame stiffness.

BRIEF DESCRIPTION OF THE DRAWINGS

Preferred embodiments of the invention are described below with reference to the following accompanying drawings.

FIG. 6 is an enlarged, top, diagrammatic, plan view showing opposed drive motors and eccentric masses;

FIG. 7 is a graph showing a decrease in structural natural frequency as the frame length increases;

DESCRIPTION OF PREFERRED EMBODIMENTS

Figure 1:
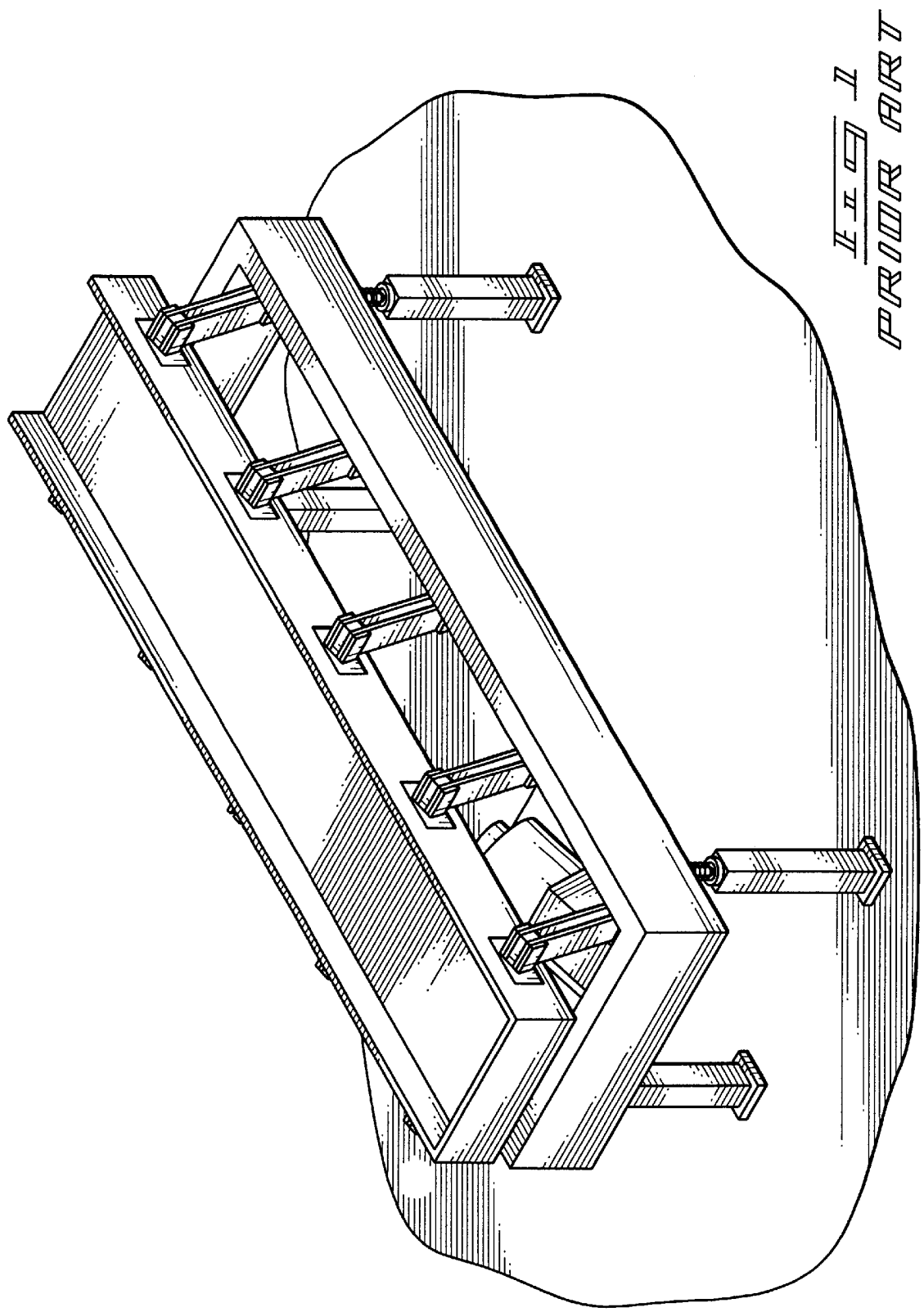
FIG. 1 is a perspective view of a prior art form of excited frame vibratory conveyor.
Figure 2:
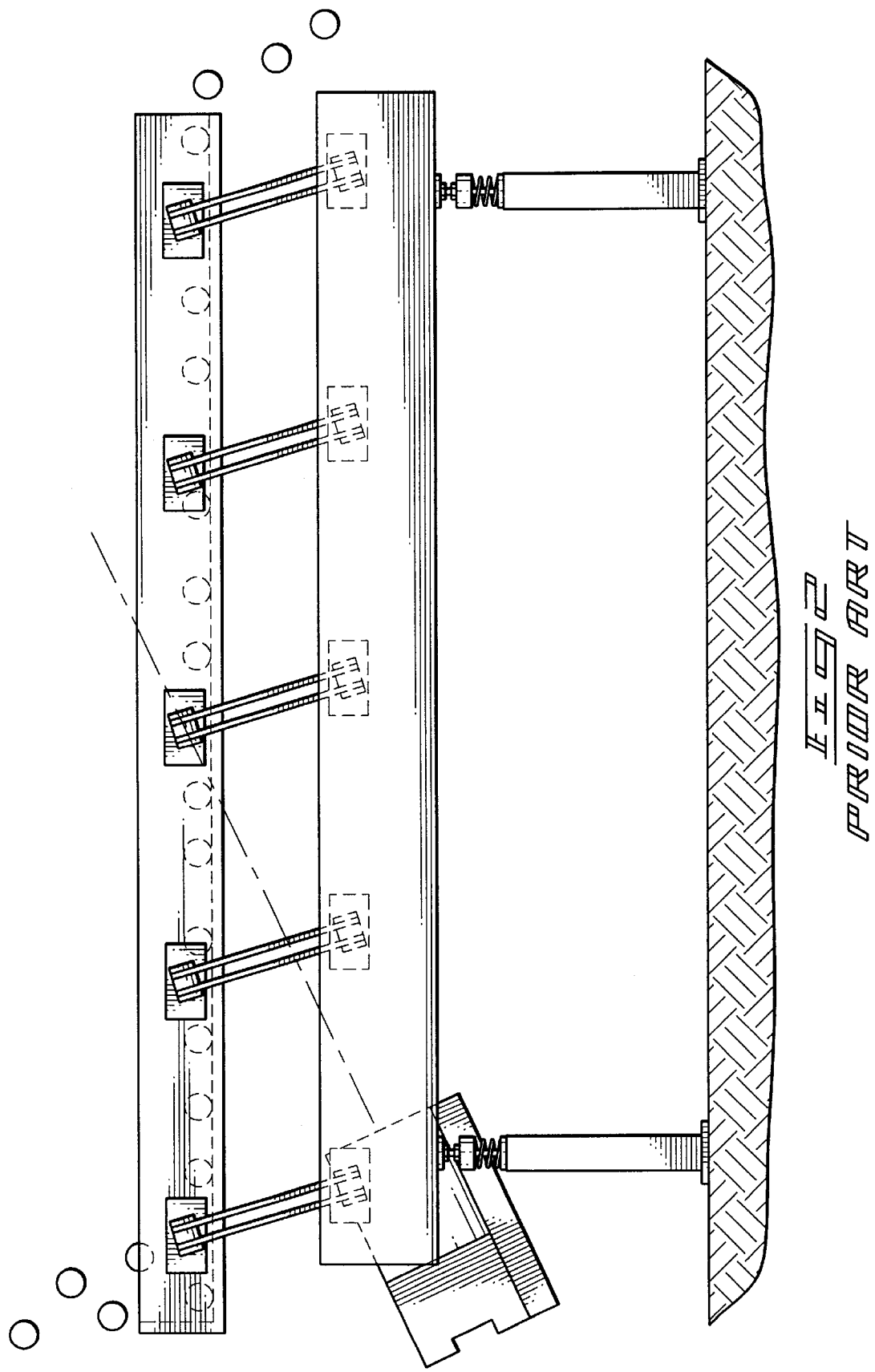
FIG. 2 is a side elevation view of the prior art excited frame vibratory conveyor shown in FIG. 1.

This disclosure of the invention is submitted in furtherance of the constitutional purposes of the U.S. Patent Laws "to promote the progress of science and useful arts" (Article 1, Section 8).

Referring now to FIGS. 3–6 a first aspect of the present invention includes an excited frame conveyor 10 having a conveyor bed 11 which is movably supported on a frame 12 and which has a first natural structural frequency. A vibratory drive 13 is mounted on the frame 12 and is operable to vibrate the frame 12 at an operational frequency that is at least one hertz greater the first natural structural frequency of the frame 12.

Still further, another aspect of present invention includes an excited frame conveyor 10 having a frame 12 which has a first natural structural frequency. A reciprocally movable conveyor bed 11 is borne by the frame 12. A drive assembly 13 is borne by the frame and is operable to drive the reciprocally moveable conveyor bed 11 at an operating frequency greater than the first natural structural frequency of the frame 12 during normal operation.

In another aspect of the present invention, the excited frame conveyor 10 includes a frame 12 having a first natural structural frequency. A conveyor bed 11 is disposed in spaced, force receiving relation relative to the frame 12, the conveyor bed 11 being operable to reciprocate in a prescribed direction relative to the frame 12 when force is imparted to the conveyor bed 11 by the frame 12. A drive 13 is mounted on the frame 12 and imparts force to the conveyor bed 11 through the frame 12, and the conveyor bed reciprocates at a frequency greater than the frame first structural natural frequency.

In yet a further aspect of the present invention, the excited frame conveyor 10 includes a frame 12 having a first natural structural frequency. A conveyor bed 11 is also included with a suspension 14 coupling the frame 12 and the conveyor bed 11 and facilitating reciprocal movement of the conveyor bed 11 in a prescribed direction relative to the frame 12. A drive 13 comprising a pair of drivers 15, 16 (FIG. 4) are mounted on the frame and which reciprocally move the conveyor bed 11 at a frequency greater than the frame first natural structural frequency, and wherein the respective drivers impart force through the suspension 14 to the conveyor bed 11 to cause the reciprocal motion of the conveyor bed 11. A controller 17 (FIG. 3) is provided for selectively energizing the individual drivers 15, 16.

In still another aspect of the present invention, a vibratory conveying method is provided which includes the step of providing a frame 12 having a first natural structural frequency and providing a conveyor bed 11 which is borne by the frame 12 and which is reciprocally moveable in a prescribed direction. Still further first and second vibratory drivers 15, 16 are provided on the frame 12 and which impart reciprocal movement to the conveyor bed 11 by imparting force to the frame 12. The method also includes synchronizing operation of the first and second vibratory drivers 15 and 16 to reciprocate the conveyor bed 11 at an operating frequency which is greater than the first natural structural frequency of the frame 12.

A further aspect of the present invention includes a vibratory conveying method which includes the step of providing a frame 12 having a first structural natural frequency, and providing a conveyor bed 11 which is borne by the frame 12 and which is principally reciprocally moveable in a prescribed direction and which further is moveable in a direction which is disposed laterally outwardly relative to the prescribed direction. The method further includes providing first and second vibratory drivers 15 and 16 on the frame 12 and which impart reciprocal movement to the conveyor bed 11 by imparting force to the frame 12. Yet further, the method includes synchronizing operation of the first and second vibratory drivers 15, 16 to reciprocate the conveyor bed 11 at a frequency which is greater than the first natural structural frequency of the frame 12, by activating or energizing the first vibratory driver 15 to reciprocate the conveyor bed 11 at a first predetermined frequency in which the conveyor bed 11 has minimal movement in the lateral outward direction, and wherein at this first predetermined frequency, the second vibratory driver 16 is energized and increases to a speed that closely matches the speed of the first vibratory driver 15. Once this is achieved, both the first and second vibratory driver speeds are further increased to a frequency greater than the frame first natural structural frequency to an operational frequency which causes the conveyor bed to vibrate and transport material in a desired manner.

Another aspect of the present invention relates to a vibratory conveying method which includes providing a frame 12 having a plurality of frame structural frequency modes; providing a conveyor bed 11 which is borne by the frame 12 and which is principally reciprocally moveable in a prescribed direction; providing a vibratory drive 13 on the frame which imparts reciprocal movement to the conveyor bed 11 by imparting force to the frame 12; and operating the vibratory drive 13 at an operating frequency intermediate successive frame structural frequency modes to cause vibration of the conveyor bed 11 in the prescribed direction.

The present invention also relates to a vibratory conveying method which includes the steps of providing a frame 12 having a plurality of frame structural frequency modes and providing a conveyor bed 11 which is borne by the frame 12 and which is principally reciprocally moveable in a prescribed direction and which further is moveable in a direction which is disposed laterally outwardly relative to the prescribed direction; providing first and second vibratory drivers 15, 16 on the frame 12 and which impart reciprocal movement to the conveyor bed 11 by imparting force to the frame 12; energizing the first vibratory driver 15 to initiate reciprocation of the conveyor bed 11, and subsequently energizing the second vibratory driver 16 to bring the vibrational frequency of the frame 12 to a level between successive frame structural frequency modes.

The present invention also relates to a vibratory conveying method which includes the steps of providing a frame 12 having a plurality of frame structural frequency modes; providing a conveyor bed 11 which is borne by the frame 12 and which is principally reciprocally moveable in a prescribed direction and which further is moveable in a direction which is disposed in laterally outward relation to the prescribed direction; providing first and second vibratory drivers 15, 16 on the frame and which impart reciprocal movement to the conveyor bed 11 by imparting force to the frame 12; synchronizing the operation of the first and second vibratory drivers 15, 16 by energizing the first vibratory driver 15 to reciprocate the conveyor bed 11 at a first frequency between successive frame structural frequency modes and in the prescribed direction of the conveyor bed and which causes minimal movement of the conveyor bed in the lateral direction, and wherein at the first frequency, the second vibratory driver 16 is energized to a speed at least approaching that of the first vibratory driver 15; and subsequently increasing both the first and second vibratory driver speeds to an operational frequency greater than the first natural structural frequency of the frame 12, to cause the conveyor bed 11 to vibrate at this operational frequency.

The present invention also relates to an excited frame conveying process including the steps of providing a frame 12 and an elongated conveyor bed 11 on the frame 12 for reciprocal movement thereon; providing first and second vibratory drivers 15, 16 on the frame 12, and activating the first vibratory driver 15 to reach an operational frequency;

and activating the second vibratory driver 16 once the first vibratory driver 15 reaches said operational frequency.

The present invention also relates to an excited frame conveying process including the steps of providing a frame 12; an elongated conveyor bed 11; and directional spring beams 18 located between the frame 12 and conveyor bed 11; providing an isolation suspension 19 between the frame 12 and the earth surface; providing first and second vibratory drivers 15, 16 on the frame; synchronizing operation of the first and second vibratory drivers 15, 16 such that the first vibratory driver 15 is initially energized to a first frequency at which the elongated bed 11 exhibits a minimal lateral outward motion component; energizing the second vibratory driver 16 once the first driver 15 reaches the first frequency; and increasing the speed of the first and second vibratory drivers 15, 16 to a normal operational frequency which is above the first frequency.

The present invention also relates to an excited frame conveyor having a frame 12 and an elongated conveyor bed 11 having a major longitudinal axis X (FIG. 4) and which is reciprocally moveably borne by the frame 12. A drive assembly 13 is mounted on the frame 12 to produce a drive force which is imparted substantially along the longitudinal axis and wherein the drive 13 includes an eccentric mass 37 which is mounted for rotation about an axis which is substantially perpendicular to the major longitudinal axis (FIG. 6).

The present invention also relates to an excited frame conveyor 10 which includes a frame 12 having a first structural frequency, and a frame support 20. A frame isolation suspension 19 bearing the frame 12 on the frame support 20 is provided and which defines a first resonant frequency. An elongated conveyor bed 11 having a major longitudinal axis X is provided and a directional shaker suspension 14 is located between the frame 12 and conveyor bed 11, and which further produces a second resonant frequency. A first vibratory driver 15 is mounted to the frame. A second vibratory driver 16 is also mounted to the frame 12 in spaced relation to the first vibratory driver 15. The first and second drivers are independently operable. The first and second vibratory drivers 15, 16 synchronously operate, however, at an operational frequency that is greater than the first structural frequency of the frame 12, and between the first and second resonant frequencies.

Figure 12:
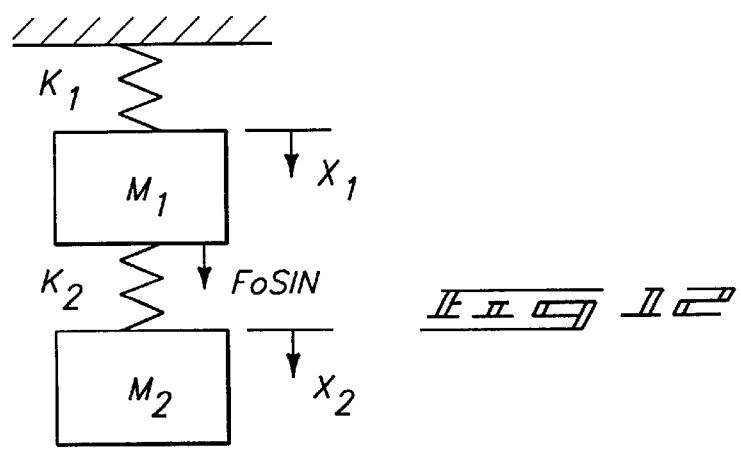
FIG. 12 is a diagram of a dynamic vibration absorber model.

The preferred system employs excited frame technology where the respective drives apply a sinusoidal varying force to the frame 12. In its simplest form, the displacement characteristics of the system as described above can be approximated mathematically by the Dynamic Vibration Absorber model commonly found in mechanical vibration textbooks and which is shown in FIG. 12.
Components of the model include:
  $M_1$=frame mass including weight of the drives;
  $M_2$=bed mass;
  $K_1$=isolation spring rate, total of all springs in the direction of system motion;
  $K_2$=beam spring rate, total of all springs between the bed and frame;
  FoSIN$\omega$ represents a sinusoidal drive forcing function with frequency ($\omega$) applied to the frame mass;
  $X_1$=displacement of frame mass, $M_1$; and
  $X_2$=displacement of bed mass, $M_2$.
The solutions to the equations of motion for the system for any force applied to the frame and frequency are as follows:

$$X_1=Fo(K_2-M_2\omega^2)/[(K_1+K_2-M_1\omega^2)(K_2-M_2\omega^2)-K_2^2]$$

$$X_2=(Fo*K_2)/[(K_1+K_2-M_1\omega^2)(K_2-M_2\omega^2)-K_2^2]$$

The frequency at which the motion of the frame mass ceases altogether is at the point where $w=(K_2/M_2)^{1/2}$. This is a design point where the frame motion is minimized. Experience has shown that for system stability, the present system will have optimum performance if it is operated at a speed slightly higher than the design point. The present conveyor preferably operates at a frequency between the resonant frequency of the bed and arm beams $[\omega=(K_2/M_2)^{1/2}]$ and the second system natural frequency of a two degree of freedom system. The result is that the present conveyor can operate with a low force input but with some inherent frame motion. Preferred apparatus for accomplishing such results will now be described.

In the present invention 10, the bed 11 may be formed as an elongated, substantially rigid trough or pan which extends from an infeed end 30 to a discharge end 31.

Figure 4:
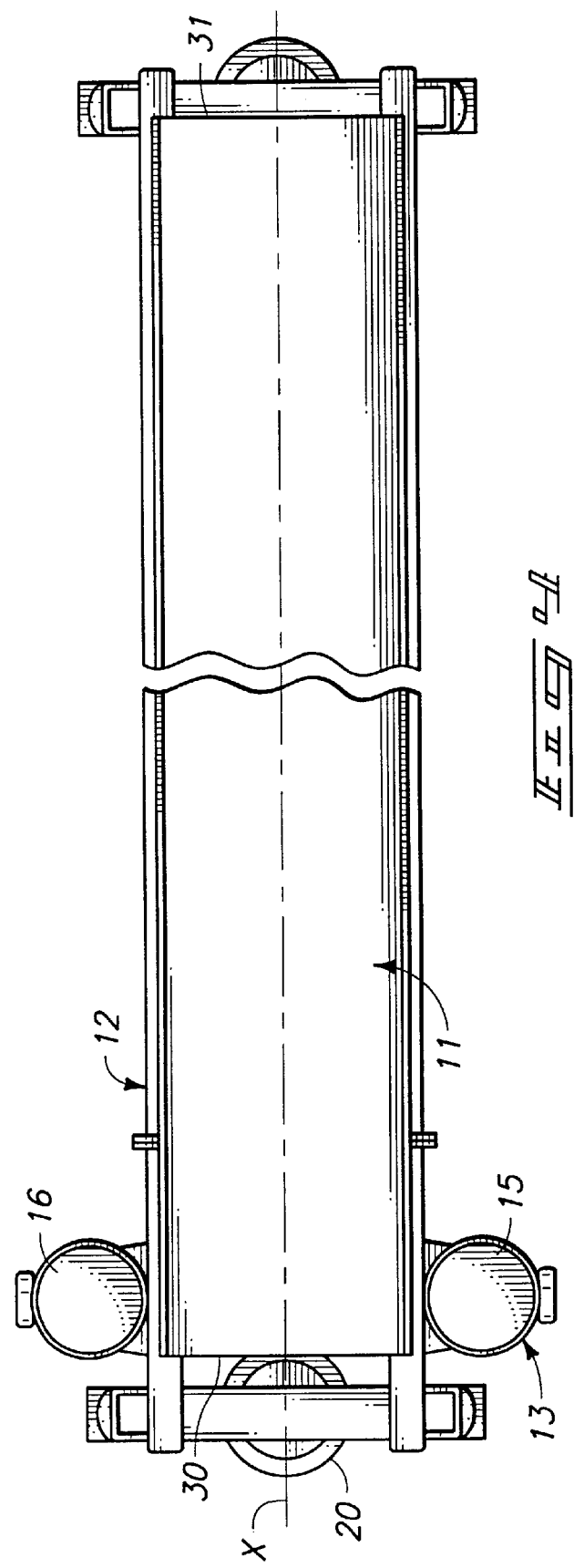
FIG. 4 is a fragmentary top, plan view of the exemplary conveyor shown in FIG. 3.

The bed 11 extends along a major longitudinal axis X (FIG. 4). The axis X is used herein for reference and may be considered to extend parallel to the bed along the lateral center thereof.

Figure 5:
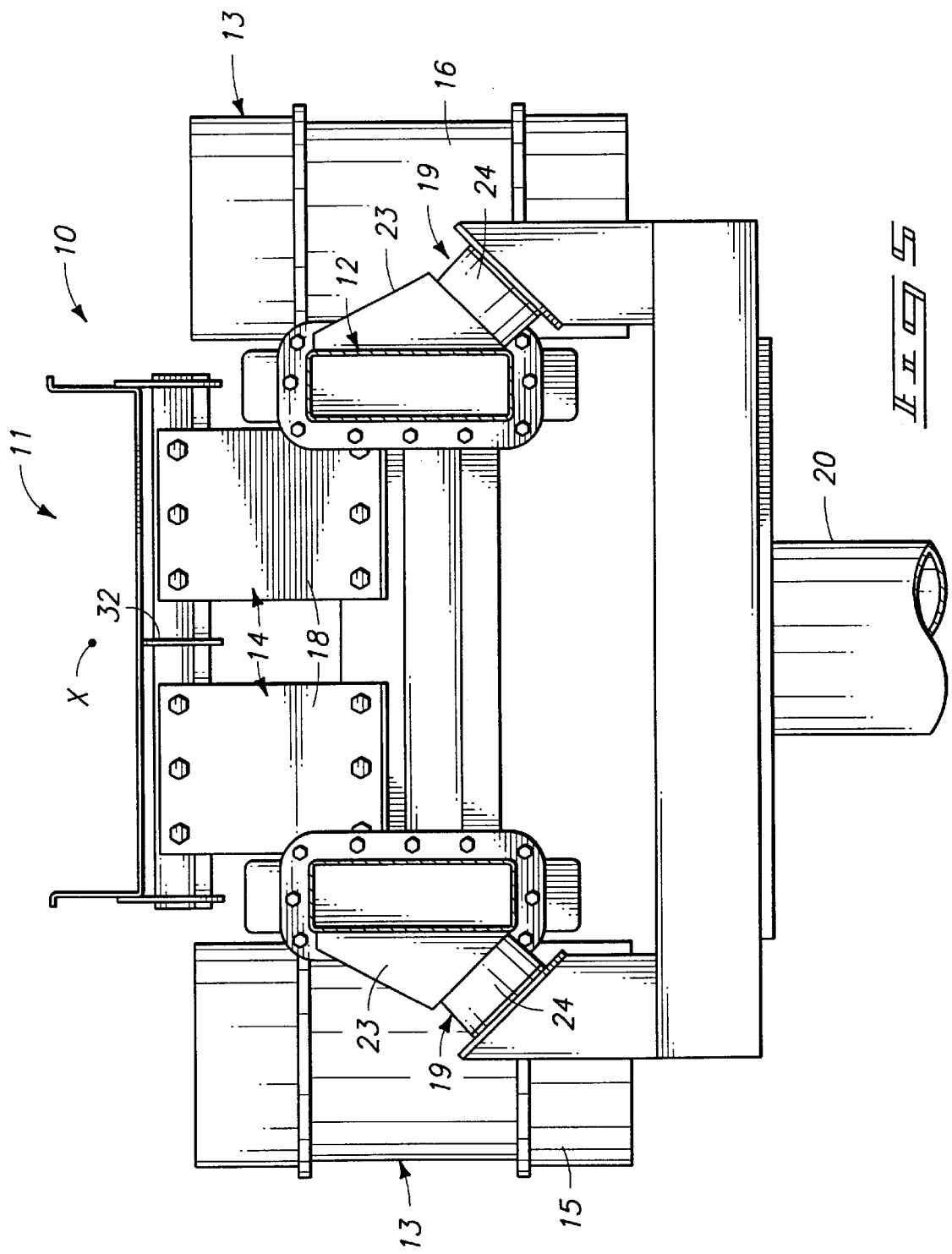
FIG. 5 is an enlarged sectional view taken substantially along line 5—5 in FIG. 3.

The bed 11 may be continuous along its length and, for example, include a "U" shaped cross sectional configuration as exemplified in FIG. 5. The bed length may also vary according to need and, contrary to many prior excited frame conveyors, may extend to lengths well over 40 feet. It should be noted that the length dimension may be significantly longer than prior forms of commercially available excited frame conveyors for the reasons that will be discussed below.

The bed 11 may be formed of relatively rigid sheet material such as stainless steel. Other materials may also be used, depending upon the nature of the materials to be conveyed. The bed may be formed of a single elongated fabricated sheet, or be assembled in segments that have been securely affixed together so when a shaking motion is applied at any point along the bed length, the entire bed will move or react as a single element. Ribbing 32 (FIG. 5) or other forms of bracing known in the art of excited frame conveyors may be used to lend longitudinal and lateral stability to the bed.

In the present invention, the bed 11 is lighter in weight than the frame 12. In particular, the bed 11 weighs at most about 0.75 of the frame weight. This particular weight relationship has been found to be most conducive to translation of motion from the frame 12 to the bed 11.

The bed 11 is mounted on the frame by way of the suspension 14 which is provided to join the frame 12 and the conveyor bed 11 and which facilitates movement of the conveyor bed 11 relative to the frame. The suspension 14 includes spring beams 18 which extend between the bed 11 and frame 12. The spring beams 18 are spaced along the length of the bed 11 and frame 12, and are angularly inclined in a manner similar to the springs described in U.S. Pat. No. 4,313,535 which is hereby incorporated by reference into the present application.

As will be recognized, the frame 12 and bed 11 are shown with the spring beams 18 supporting the bed 11 above the frame 12. It is, of course, possible that a bed could be suspended from an overhead frame, as suggested in U.S. Pat. No. 5,037,536 which is also incorporated by reference into the present application.

Figure 3:
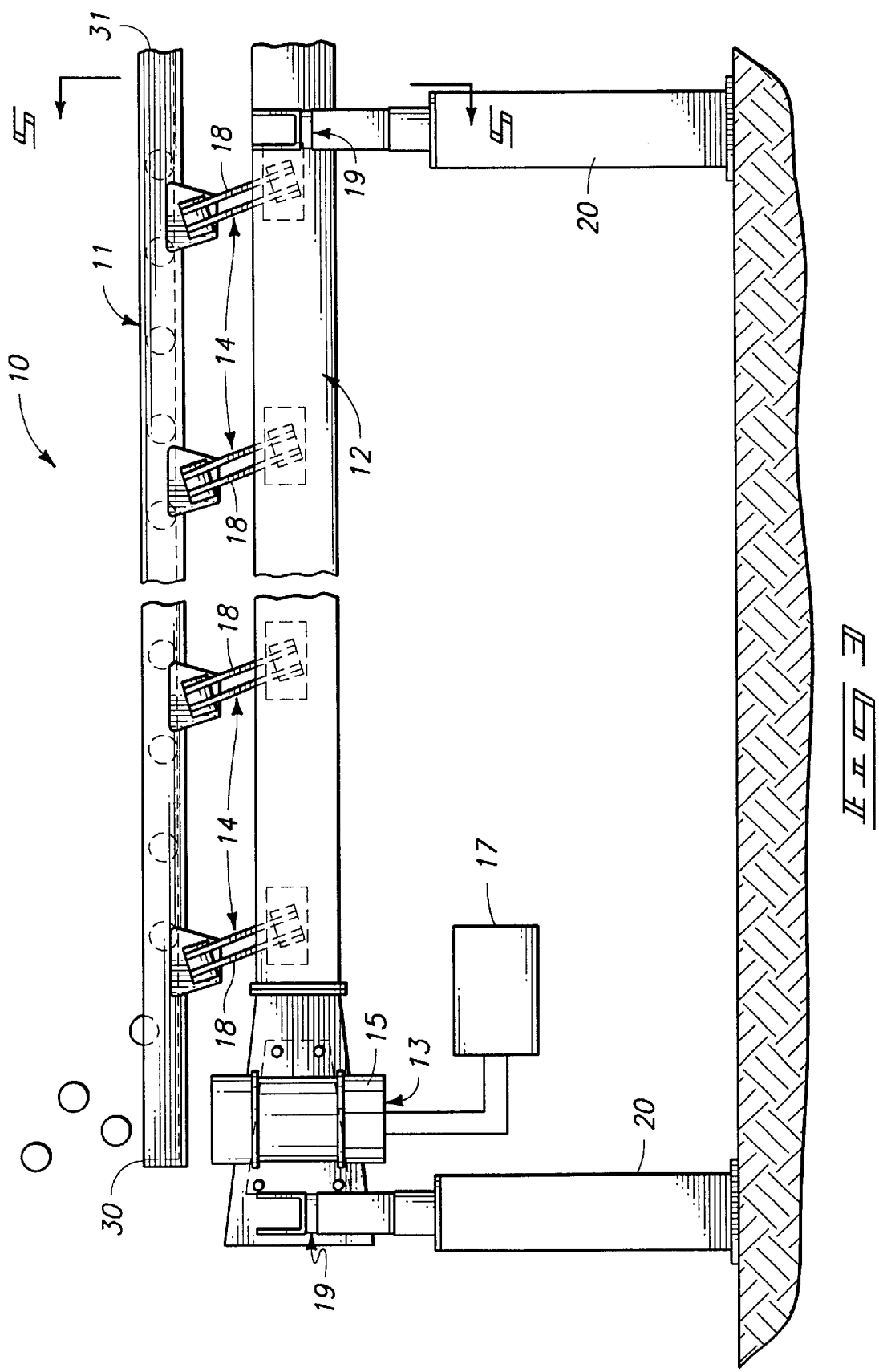
FIG. 3 is a fragmentary, side elevation view of a preferred form of the present excited frame conveyor the Figure being broken to indicate an indeterminate length.

The frame 12 is preferably approximately equal in length to the bed, and is mounted by the isolation suspension 19 at support stations spaced along the length of the frame 12. As seen in FIGS. 3 and 5, the isolation suspension 19 is angularly oriented toward the longitudinal axis X from opposite sides thereof (see FIG. 5). The bed 11 is thus cradled by the suspension 19. The angularly oriented suspension has been found to increase lateral stability in the start-up, running, and shutdown conditions. The spring rate can also be increased to increase the system structural natural frequencies that respond to this type of constraint.

The isolation suspension 19 may be provided as a plurality of isolator assemblies 23 (FIG. 5) spaced along the conveyor, each with a pair of isolator springs 24 that are rotated approximately 45° toward the center axis X. The springs 24 may be provided in the form of shaped synthetic elastomer pads having a durometer value of between approximately 20 and 80. In general, elastomeric compounds are much stiffer in compression than in shear. In this arrangement, the compression direction will carry the majority of the weight of the machine and provide lateral constraint. The shear directions, especially along the length of the shaker, reduces or softens the spring rate in the direction the frame moves during the running conditions.

The preferred isolators 19 will operate over their specific natural frequency, which will reduce the dynamically transmitted forces through them. The isolator springs 24 also provide some vibratory damping to the overall structure. This tends to flatten or reduce the amplitude peaks of system natural frequencies. This is not considered to be a favorable way to influence system performance since much energy and efficiency is lost through the production of heat.

It is noted that elastomeric isolators 24 are shown herein by way of example, and that other spring configurations could be used. Coil springs, for example could also be used as shown by U.S. Pat. No. 2,353,492, or leaf springs as shown in U.S. Pat. No. 2,951,581. Both referenced patents are hereby incorporated by reference in the present application.

It is noted that the shaker suspension 14 (between the frame 12 and bed 11), and the isolation suspension 19 (between the frame 12 and support 20) are normally called upon to deflect, store and release energy during normal operation of the conveyor. During operation when the springs are deflecting and the structure (bed and frame) is stable (not bending), the system is said to be within an arm spring resonant mode. The frame isolation suspension and the shaker suspension defines first and second resonant frequencies that define a "system frequency".

It is desirable for the conveyor to operate in an arm spring mode, where the springs alone are deflecting. However, at certain frequencies, the frame and bed themselves will effectively become springs and join with the suspensions 14 and 19, deflecting in undesired directions. Such frequencies invoking the frame and bed are identified as "structural frequencies" and are not desired. It is in particular the frame structural frequencies that come into play when the overall conveyor length is increased to the point where the structural members (the frame and bed) become flexible and react as deflecting springs at relatively low frequencies. It is an objective of the present invention to avoid or minimally excite structural frequencies so that longer conveyors may be fabricated.

Preferred forms of the drive 13 are illustrated in FIGS. 4 and 6. As previously indicated, the drive 13 may be comprised of a pair of drivers 15, 16. Preferably, the drivers are forms of cyclic force generators that are mounted to the frame 12 to produce cyclic forces along the frame length. Specific examples of cyclic force generators include drive motors that mount eccentric weights for producing the cyclic forces when in operation. More specifically, exemplary motors may be of the type including a rotatable arbor or drive shaft with one or more eccentric weights mounted thereto. In the illustrative example, two separate, mechanically isolated drive motors 34, 35 (FIG. 6) are shown and which mount eccentric masses 36, 37 respectively. It is preferred that the motors be mounted to the frame on opposite sides of the central axis X, and in substantial lateral alignment, that is, it is preferred that the motors be positioned at substantially equal distances from the ends of the frame.

The exemplified drive motors 34 and 35 are the source of energy supplied to the system to induce the desired motion of the bed and thus move product. The drives are preferably used in pairs, and more than one pair may be used according to the desired conveyor length. The eccentric masses 36 and 37 are rotated, preferably in opposed directions, by the motors 34, 35 to provide a controlled sinusoidal drive force down the length of the frame 12 at the desired frequency.

It should be understood that the motors 34 and 35 are mounted directly to the frame 12 and that the rotational axes for the respective motors are preferably substantially perpendicular to the major longitudinal axis X. Thus the forces produced by the rotating eccentric masses 36, 37, are directed in a plane that is parallel to the axis X. This is a noteworthy distinction over prior art excited frame conveyors where the drives are offset so the forces produced are directed through the center of mass of the apparatus. The present arrangement produces lines of force along the length of the frame to minimize bending along the frame length.

It has been discovered that the motors and eccentric masses should be matched so the forces exerted by one motor and attached mass will be substantially equal to that produced by the other motor and mass at the same RPM. Substantially matched drives may minimize "tuning" to balance the driving forces.

A controller 17 is provided to start up, run, and shut down the respective drivers 15, 16 in a manner that will minimize the time spent in undesired frame structural frequency modes, and which further will most efficiently utilize the energy provided by the drivers. The controller may make use of conventional programmable switching that may be set to start the drivers in a staggered, sequence which was discussed briefly, above.

Since the drivers are not mechanically timed (by direct physical connection), synchronization is achieved with the help of inertia and transmitted forces through the frame. In this regard, the drivers will tend to synchronize in a direction normal to the motor shaft that has the highest amplitude of motion. For example, the drivers are mounted on the frame with their shafts in a vertical orientation. As such, the eccentric masses synchronize in any direction in a horizontal plane. If the frame becomes excited in a structural mode that is evidenced by movement of the frame from side-to-side in the start up process, and if that same motion is greater in that direction than down the length of the frame, then the drivers will have a tendency in this scenario to synchronize in the side-to-side direction. Once this motion is started, the side-to-side motion will be amplified. The higher the side to side amplitude, the more drive torque is required to continue the ramp up through that frequency. As will be recognized once a critical amplitude is reached, the drivers may no longer have enough torque available to continue to ramp-up and move past the structural mode. The critical amplitude of a driver is the amplitude of the drive motor at a given frequency that once reached, the driver can no longer increase its frequency or drive through it.

Several characteristics of the present conveyor 10 are provided to encourage motion predominantly along the length of the conveyor bed 11. For example, the spring beams 18 are configured and mounted to permit motion of the bed along the length dimension, but to discourage motion in lateral directions. Also, the isolator springs 24 will discourage motion of the frame 12 in undesired lateral directions. Thus there will be a tendency for the primary motion and amplitude to be along the conveyor length. However, even with the above provisions, the various structural frequency modes are unavoidable, and become a serious concern especially with a long frame 12 that can be excited at a number of structural frequencies that are close to or below the required operating frequency of the conveyor 10.

To avoid or minimize undesired motion of the frame 12, a start-up sequence is provided using conventional relay timers and central parameters in the controller 17. In this start up sequence, one of the drivers 15 or 16 is started before the other. With only one driver operating, the amount of energy delivered to the frame by the rotating mass on same is about half of the potential energy capable of being delivered to the frame if both drivers were operating. The frame 12 will move through structural frequencies with the lower energy input from the single driver and consequent low amplitudes will be developed below the critical amplitude where the driver would otherwise stall.

Once the frame 12 has been set in motion primarily in the desired direction, the second driver will be activated or energized. The time delay may be approximately equal to the time required for the first driver to reach its operational frequency (typically about 2 seconds). Once reaching this frequency, the second driver is started, after a delay allowed by a relay timer of, about 2–3 seconds. In this situation, the frame and the first driver are already in motion, with inertia primarily in the longitudinal direction. As such it has been discovered that it now becomes an easier task for the second driver once energized to quickly pull the frame through undesired frequency modes and bring the system to the desired operating amplitude.

In another method of start-up, termed a "synch and go" process, the starting sequence is staggered in a manner somewhat similar to that described above, with the exception that the second driver is started before the first driver reaches its full operating rpm. Activation of the second driver is timed to start at an intermediate frequency in the ramp up of the first driver where there is minimal lateral motion of the conveyor bed (and maximum longitudinal motion). This point may be calculated or be determined by experimentation. By starting the second driver at such a point of minimal lateral motion, maximum inertia will have been built and established in the desired direction. As such the second driver will be naturally influenced to synchronize with the first driver in this direction thereby avoiding or minimally exciting structural natural frequencies through the ramp-up to the final operating speed.

The final operating frequency is selected to be between successive natural structural frequencies of the frame, or at least one hertz higher than the first natural structural frequency of the frame. The final operating frequency may be determined by finite element analysis, or by using available finite element design software. The operating range may be several hertz above, with a minimal safety margin of approximately one hertz from the nearest structural frequency modes.

Figure 8:
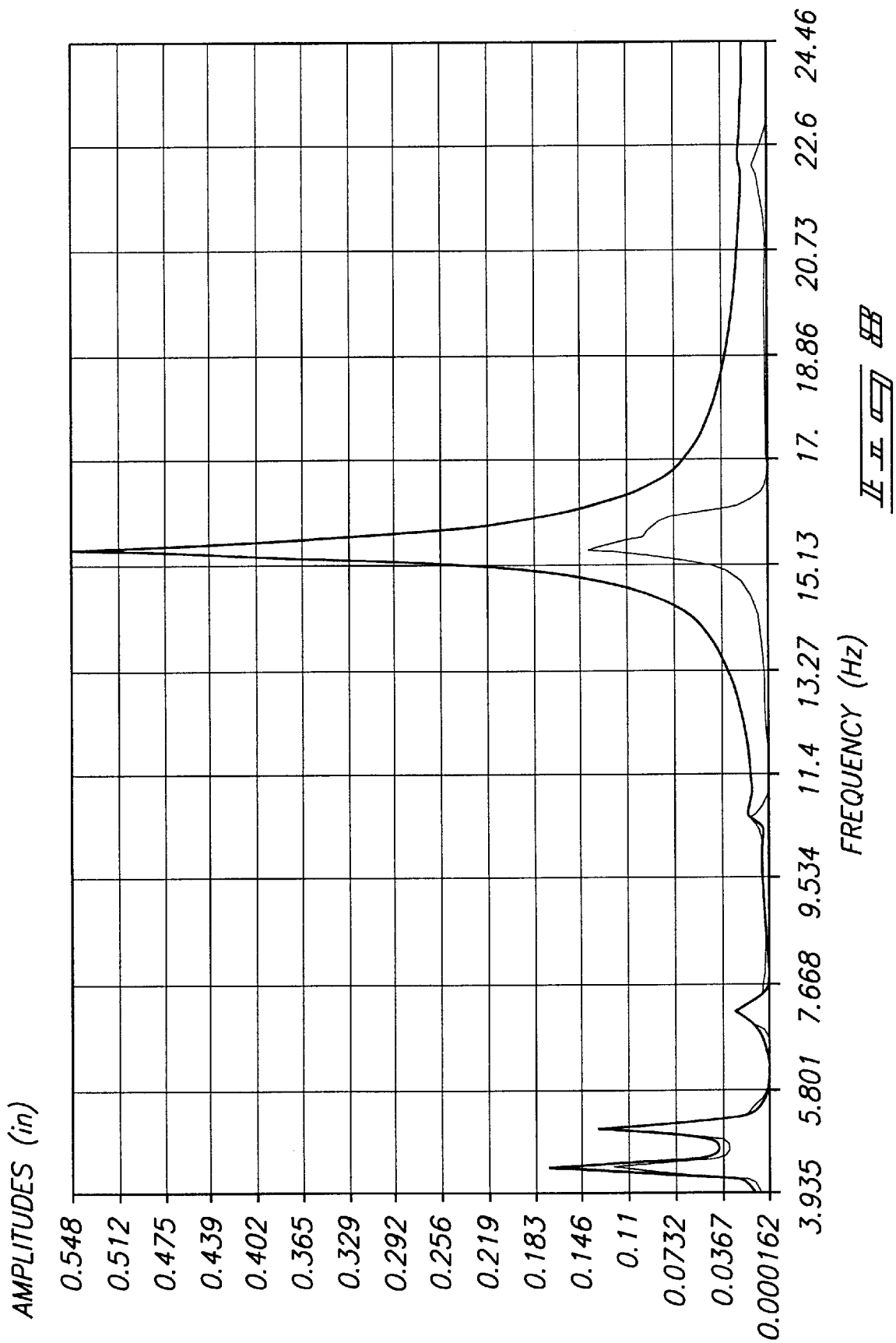
FIG. 8 is a graph showing the amplitude/frequency curves with successive peaks indicating various frequency modes.

The conveyor 10, may operate with the drivers running within a range of approximately 700–1000 rpm, with bed strokes varying between approximately 7/16" and 5/8". FIG. 8 illustrates vertical amplitude/frequency response curves for an exemplary conveyor 10 having a bed 102 feet in length. Spikes along the curve indicate natural frequency locations. The top line represents the bed and the bottom line represents the frame. The first structural frequency in the example occurs at approximately 5.54 Hz.

The operating frequency range for preferred forms of the present conveyor may be between approximately 13.3 and 15 Hz, well over the first structural natural frequency, and just under the second system natural frequency of a two degree of freedom system where the bed and frame motion are in opposition. This operating range, as may be noted, is beyond several structural and isolator frequencies, and is between adjacent structural frequency modes by at least one hertz.

Figure 9:
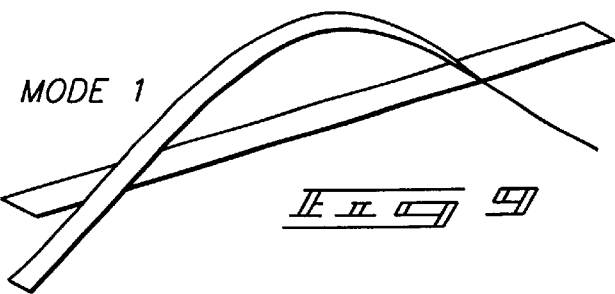
FIGS. 9–11 are diagrams indicating frame curvature in several structural natural frequency modes.
Figure 10:
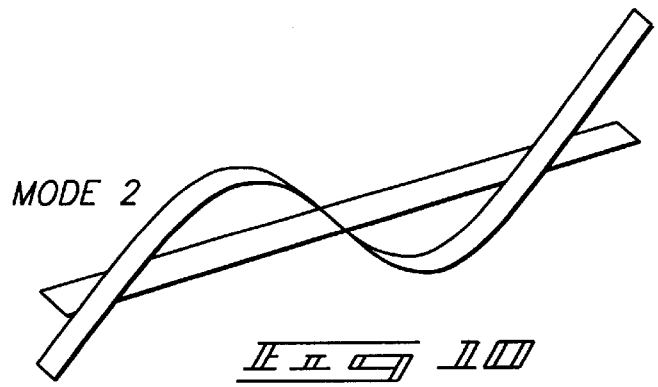
Figure 11:
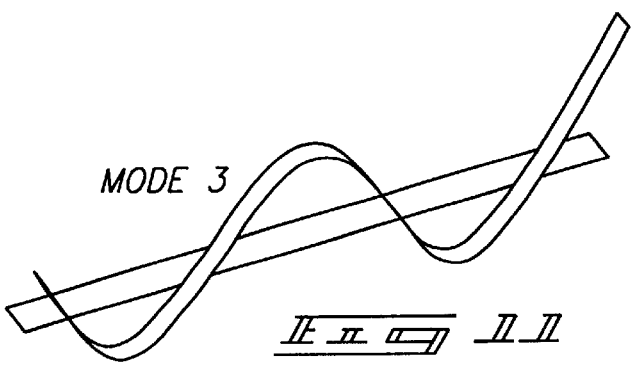

FIGS. 9–11 shows examples of several frame deflection configurations which may occur in a particular exemplified conveyor at several frequencies under 25 Hz. For example, the mode illustrated in FIG. 9 may occur at approximately 5.54, 7.14, 10.56, 15.95, and 22.24 Hz for a 102 foot long conveyor bed and frame. The other modes will occur and re-occur at other frequencies as well, thus narrowing the selection for the operating range. However, with preferred drives and control, the lower structural frequency modes may be passed by, and the operating speed may be attained without adverse bed or frame movement in modes that would otherwise damage or shorten the effective life of the conveyor.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An excited frame conveyor, comprising:
   a frame having a first natural structural frequency;
   a reciprocally moveable conveyor bed borne by the frame;
   a drive assembly including a first and second drive motors which are mounted on the frame; and
   a synchronizing control for actuating the drive motors in a starting sequence in which the first motor is activated and allowed to progress to a predetermined RPM that is associated with a minimal lateral vibration of the conveyor bed, and thereafter the second drive motor is activated approximately at the predetermined RPM of the first motor, and wherein the drive assembly drives the reciprocally moveable conveyor bed at an operating frequency greater than the first natural structural frequency of the fame during normal operation.

2. An excited frame conveyor, comprising:
   a frame having a first structural frequency;
   a conveyor bed;
   a suspension coupling the frame and the conveyor bed, and facilitating reciprocal movement of the conveyor bed in a prescribed fashion relative to the frame;
   a drive comprising a pair of drivers mounted on the frame and which reciprocally moves the conveyor bed at a frequency greater than the frame first structural natural frequency, and wherein the respective drivers impart force through the suspension to the conveyor bed to cause the reciprocal motion of the conveyor bed; and
   a controller for selectively energizing the individual drivers, and which includes a synchronizing control which selectively energizes the respective drivers in a starting sequence wherein one driver is energized and allowed to progress to a predetermined operating frequency and through and past a frame frequency that is associated with minimal lateral movement of the conveyor bed, and wherein following this first energizing, the remaining driver is activated approximately at the operating frequency and allowed to progress to an operating frequency that is substantially similar with the first energized driver.

3. An excited frame conveyor, comprising:

a frame having a first structural frequency;

a frame support;

a frame isolation suspension bearing the frame on the frame support and defining a first resonant frequency;

an elongated conveyor bed having a major longitudinal axis;

a directional shaker suspension located between the frame and conveyor bed and defining a second resonant frequency;

a first vibratory driver mounted on the frame;

a second vibratory driver mounted on the frame and disposed in spaced relation to the first vibratory driver; and wherein the first and second vibratory drivers when energized synchronously operate at an operational frequency that is greater than the first structural frequency of the frame and between the first and second resonant frequencies.

4. An excited frame conveyor, comprising:

a frame having a first natural structural frequency;

a reciprocally moveable conveyor bed borne by the frame; and a drive assembly borne by the frame and having a pair of drivers which are individually and sequentially energized and operated at predetermined frequencies to cause the reciprocally moveable bed to operate at a frequency which is greater than the first natural structural frequency of the frame while simultaneously minimizing undesired motion in the frame when the frequency of vibration of the reciprocally moveable conveyor bed approaches and passes through the first natural structural frequency.

5. An excited frame conveyor, comprising:

a frame having a first natural structural frequency;

a reciprocally moveable conveyor bed borne by the frame, and which is moveable along a path of travel, and wherein the conveyor bed defines a plane of reference; and a drive assembly borne by the frame, and which rotates an eccentric mass in a plane that is substantially parallel to the plane defined by the conveyor bed, and wherein the drive assembly causes the reciprocally moveable conveyor bed to operate at a frequency greater than the first natural structural frequency of the frame.

* * * * *